United States Patent
Sun

(10) Patent No.: US 7,130,297 B1
(45) Date of Patent: Oct. 31, 2006

(54) ARCHITECTURE FOR A MIXED VOICE AND DATA NETWORK

(76) Inventor: Peter C. P. Sun, 2624 Hostetter Rd., San Jose, CA (US) 95132

( * ) Notice: Subject to any disclaimer, the term of this patent is extended or adjusted under 35 U.S.C. 154(b) by 0 days.

(21) Appl. No.: 09/519,605

(22) Filed: Mar. 6, 2000

(51) Int. Cl.
H04L 12/66 (2006.01)
H04L 12/28 (2006.01)

(52) U.S. Cl. ............... 370/352; 370/392; 370/450; 370/493

(58) Field of Classification Search ........ 370/351–357, 370/386, 389, 392, 395.1, 395.2, 395.5, 395.52, 370/401, 410, 445, 449, 450, 464–467, 493–496, 370/395.55
See application file for complete search history.

(56) References Cited

U.S. PATENT DOCUMENTS

| | | | |
|---|---|---|---|
| 4,785,449 A | 11/1988 | Nakamura et al. | 370/381 |
| 5,341,374 A | 8/1994 | Lewen et al. | 370/450 |
| 5,410,599 A * | 4/1995 | Crowley et al. | 380/269 |
| 5,604,737 A | 2/1997 | Iwami et al. | 370/352 |
| 5,742,596 A * | 4/1998 | Baratz et al. | 370/352 |
| 5,790,548 A | 8/1998 | Sistanizadeh et al. | 370/401 |
| 5,929,748 A | 7/1999 | Odinak | 340/310.01 |
| 5,991,634 A | 11/1999 | Hui et al. | 455/513 |
| 5,999,612 A | 12/1999 | Dunn et al. | 379/212 |
| 6,005,861 A | 12/1999 | Humpleman | 370/352 |
| 6,167,043 A * | 12/2000 | Frantz | 370/356 |
| 6,173,044 B1 * | 1/2001 | Hortensius et al. | 379/93.09 |
| 6,196,846 B1 * | 3/2001 | Berger et al. | 434/118 |
| 6,330,235 B1 * | 12/2001 | Olson et al. | 370/353 |
| 6,366,771 B1 * | 4/2002 | Angle et al. | 455/414.1 |
| 6,456,625 B1 | 9/2002 | Itoi | 370/401 |
| 6,490,273 B1 * | 12/2002 | DeNap et al. | 370/352 |
| 6,516,059 B1 * | 2/2003 | Shaffer et al. | 379/211.02 |
| 6,724,750 B1 | 4/2004 | Sun | 370/352 |
| 6,738,382 B1 * | 5/2004 | West et al. | 370/401 |
| 6,751,213 B1 | 6/2004 | Sun et al. | 370/352 |
| 6,982,993 B1 * | 1/2006 | Claveloux et al. | 370/503 |

OTHER PUBLICATIONS

Hwang et al., "Standardization Activities and Technology Competitors for the In-Home Networking", Proceedings of 1998 International Conference on Communication Technology, pp. 787-832.
Chen et al., "Emerging Home Digital Networking Needs", Proceedings—1997 Fourth International Workshop on Community Networking, IEEE, pp. 7-12.
U.S. Appl. No. 09/519,607 (6,856,614), Peter C.P. Sun.

* cited by examiner

*Primary Examiner*—Doris H. To
*Assistant Examiner*—Saba Tsegaye
(74) *Attorney, Agent, or Firm*—Bradley T. Sako; George O. Saile & Assoc.

(57) ABSTRACT

In the present invention a voice and data network is disclosed that has applicability to a home or building where existing phone lines are used to interconnect multiple phones and computers within the network. Voice and data modules connect telephones and computers to the existing telephone wiring in a home or building. A link to wide area network allows phone calls to be placed between the network and the Public Service telephone network. All devices connected to the telephone wiring have their own ID and communicate by Tokens in Ethernet technology. This allows Ethernet packets to perform a plurality of communications between a plurality of devices connected to the network under the control of tokens. The communications is accomplished by passing packets containing voice and data signals between phones and computers internal to the network and to an external port to connect to outside of the network. The link to wide area network also allows connection to an ISP by converting from Ethernet packets to Internet packets and from Internet packets to Ethernet packets. The connection to the ISP also allows Internet Telephony without a special telephone or the use of a computer.

13 Claims, 8 Drawing Sheets

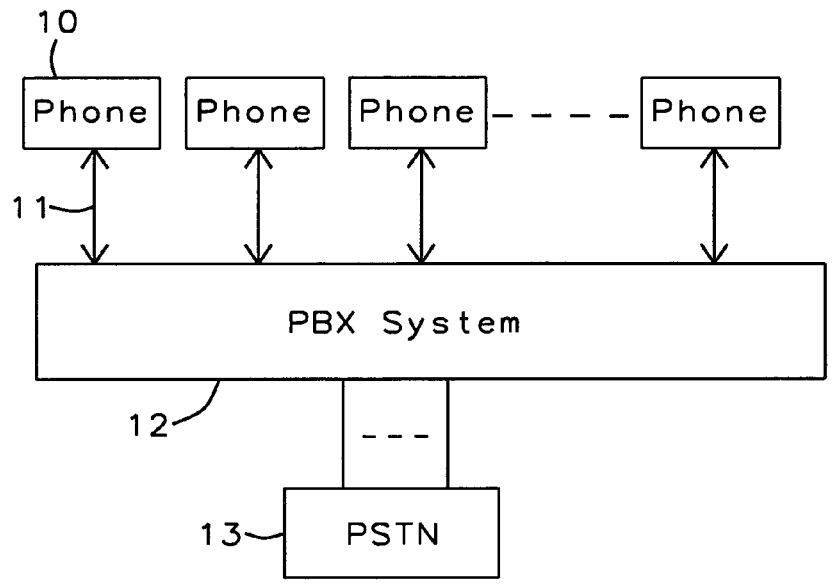
FIG. 1 – Prior Art
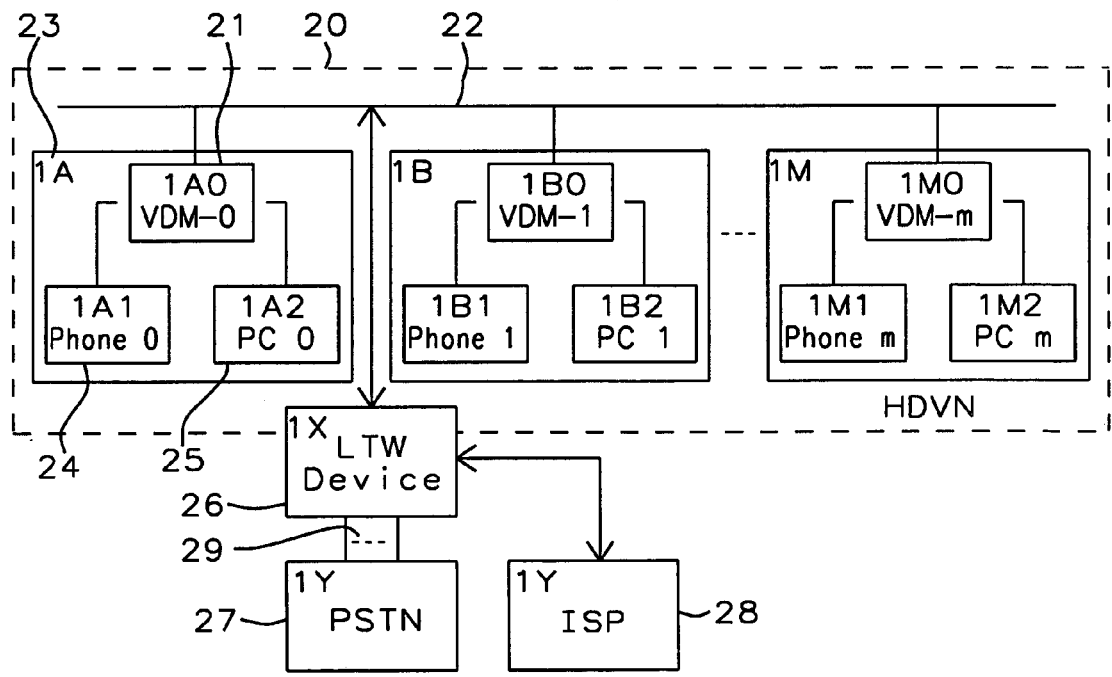
FIG. 2a

ARCHITECTURE FOR A MIXED VOICE AND DATA NETWORK

BACKGROUND OF THE INVENTION

1. Field of Invention

This invention relates to communication networks and more specifically voice and data networks within a house, an office or a building using existing telephone lines with a communication port to outside the voice and data network.

2. Description of Related Art

Within an existing home network, devices are limited to one type of network and use either voice devices such as phones or computers. There does not exist a device for home use that allows communications between multiple phones or computers using existing telephone lines. A PBX (private branch exchange) box is the only similar device, but requires each phone to be wired individually to the PBX box. The PBX box is very expensive, and it would be very expensive to adapt an existing house or building to a PBX system if all the telephone lines had to be reinstalled so that each phone line was routed separately between a telephone and the PBX box.

In "Standardization Activities and Technology Competitors for the Home Networking," Hwang et al., Proceedings of 1998 International Conference on Communication Technology, 1998, pp 787–832, in-home networking is discussed for the connection of various devices and the distribution of data to these devices. Multiple data types with security must be easily configured, have low cost and negligible maintenance. In "Emerging Home Digital Networking Needs," Chen, W. Y., Proceedings—1997 Fourth International Workshop on Community Networking, IEEE, pp 7–12, 1997, the possibility of using the IEEE 1394 protocol for a digital home network is explored. There are four driving forces for a home network that are discussed, home automation, home computer, digital audio and video distribution, and digital access network.

In U.S. Pat. No. 6,005,861 (Humpleman) a home network architecture is described that has an internal digital network interconnecting devices in the home. Network interfaces connect entertainment services into the network by coupling to an external network. In U.S. Pat. No. 5,999,612 (Dunn et al.) a computer adapter and call routing system allows broad band networks, such as cable television, to provide digital data and telephone service. In U.S. Pat. No. 5,991,634 (Hui et al.) a peer to peer protocol is used to provide a plug and play capability in a distributed telephone system. In U.S. Pat. No. 5,929,748 (Odinak) a home control system is described using the electrical wiring of a home for communications. The system includes the uses high bandwidth and high frequency channels along with low frequency channels for control information. In U.S. Pat. No. 5,790,548 (Sistanizadeh et al.) a system and method is described for providing an Internet access by means of a Public Switched Telecommunication Network (PSTN) using a full time asymmetric digital subscriber line (ADSL) between a subscriber processor terminal and a local area network (LAN) node and router located remote from the subscriber.

There are a large number of homes and buildings that have been wired for telephone service, and the wiring usually can only accommodate one or two phone lines. Attached to these phone lines can be several phones, but only one phone per line can be in use on separate conversations at one time. Also unless a calling phone is on one line and the receiving phone is on another line, communication between the two phones cannot be accomplished. A computer can use a telephone line by means of a modem to connect to an Internet service provider (ISP), but if there are more computers than phone lines, all of the computers cannot connect to the Internet a one time. If each telephone line is being used by a computer, then the telephones cannot be used, and computers cannot communicate with one another unless they are using separate lines.

SUMMARY OF THE INVENTION

The present invention provides a means by which the existing wiring in a home or building can be used as a voice and data network enabling both telephones and computers to communicate within the home, or building, as well as communicate with the Internet and a Public Switched Telecommunication Network (PSTN). A home voice and data network (HVDN) of the present invention adapts to the existing telephone lines without any rewiring and allows connection between phones within the home or building as well as between computers that may be operating within the network. Communications to phones and computers outside of the network is accommodated by a device that provides a link to either an Internet service provider (ISP) or a Public Switched Telecommunication Network (PSTN).

Nodes within the network, which might otherwise have a telephone jack for connecting to phone or modem, are connected to a network device called a voice and data module (VDM). A phone and a computer can be connected simultaneously to each VDM at each node of the network. At a node exiting the HVDN is a link to wide area network (LTW) device that is connected to an ISP and a PSTN. Communications between nodes of the network uses the Token in Ethernet Protocol (TEP) technology to enable a mix of voice and data signals to communicate simultaneously within the network. TEP technology is described in U.S. Pat. No. 6,751,213, issued to Sun et al. on Jun. 15, 2004. Each VDM device converts voice and data to Ethernet packets to be sent over the HVDN network and converts received packets to voice and data signals to be sent to the attached phone and computer. Similarly, the LTW device converts received Ethernet packets to signals to communicate with an ISP or the PSTN, and converts incoming signals from the ISP and PSTN to Ethernet packets.

Each network device, VDM and LTW, connected to the home voice and data network has an address and within this address is an address capacity to separate the phone and the computer that can be attached to the VDM. To place a call from one phone to another phone within the network a predefined number is dialed which commands the VDM to which the calling phone is attached to send a ringing signal to the VDM to which is attached the receiving phone is attached and request a connection. Each VDM device is assigned an ID number that allows the VDM devices to communicate with each other.

The ringing signal sent between VDM devices is first converted to an Ethernet packet. When the ringing packet is received by the VDM that has an ID that matches the destination address (DA) of the packet, the VDM extracts the content of the packet, recognizes it is a ringing signal and attempts to ring the phone which is connected to the receiving VDM. If the receiving phone is already in use a busy signal is sent back to the sending VDM by means of an Ethernet packet. If the receiving phone is not busy, a ringing signal is sent to the receiving phone until the receiving phone is picked up or the sending phone is hung up. Throughout this ringing procedure the two VDM devices communicate the status, such as ringing phone, receiving phone picked up and connected, and sending phone hung up. When the receiving phone is picked up, a packet is sent back to the sending VDM that a connection is made. Communication between the sending and receiving phone is by converting a voice signal at one end of the connection to an Ethernet packet, receiving the packet at the other end and converting it back to a voice signal to be connected to the phone receiving the signal. The VDM devices involved in the phone communications monitor the progress of the communication, communicating with each other by means of Ethernet packets. If one phone is hung up, the VDM to which that phone is attached sends a hang up packet to the second VDM device involved in the connection. The second VDM terminates the connection.

A multiple number of phones (conference call) can be connected in a fashion similar to the connection between two phones in the network, where the ID of each VDM involved in the conference call is known to the other VDM devices. A voice signal is converted to a Ethernet packet by a sending VDM which is sent to the receiving VDM devices involved in the conference call. Each of the receiving VDM devices will then convert the packet back to a voice signal to be sent to the attached phone. The total connection will not occur until the last VDM and its phone is connected, nor will the connection be terminated until the next to the last VDM and its phone is disconnected.

Computers connected to the VDM devices can communicate by either a modem where the VDM device converts the voice like signals from the modem to Ethernet packets, or by traditional Ethernet protocols where the computer sends Ethernet packets to the VDM device to which the computer is attached. Similar to a phone connection, the VDM devices involved in a computer to computer connection establish and monitor the connection using the network ID's to identify sending and destination addresses. The computer connection is terminated when one of the two computers involved in a computer to computer connection disconnects from the HVDN network.

Communications external to the HVDN network is done through a LTW device which has a network ID number like the VDM devices that are connected to the network. The LTW converts Ethernet packets from the VDM devices to Internet packets that can be transmitted through the Internet. When a telephone connected to a VDM needs to place a call through the Internet, calling telephone dials a destination number, the VDM converts the telephone signal to a packet and sends the packet the LTW device ID as the destination address. The LTW converts the received Ethernet packets to Internet packets to be sent to the ISP. The present invention enables Internet Telephony without a special telephone, like an IP phone, or through the computer device. Connections to a phone external to the HVDN network can also be established by the LTW device through the Public Switched Telecommunication Network (PSTN) to handle incoming calls as well as placing local calls outside of the HVDN network. Since LTW devices have ID numbers as do the VDM devices, packets can be sent between LTW devices and VDM devices that dial the number of a particular phone, ring the called phone, make the connection and hang up the connection when the phone communications is terminated. The use of Internet Telephony compared to PSTN can be dependent upon the use of an area code in the phone call being placed from within the HVDN network. Calls received through the Internet Telephone will be dependent upon the Internet Telephony being available at the phone external to the HVDN network.

The function of the HVDN network is different than a PBX box. The PBX box can only direct calls to different phone lines and requires each phone connected to the PBX box to have a dedicated line to that phone. The HVDN network, in comparison, can direct an incoming call from the PSTN to any or all phones and can allow any phone within the HVDN network to communicate with any or all phones within the network while using the existing telephone wiring within a home or building.

A plurality of VDM devices can be used as a standalone voice and data network without the use of a LTW or a PBX. The plurality of VDM devices could be located at different locations in a room and at locations in different rooms. The plurality of VDM devices would provide room to room and station to station voice communications, or data communications, or a mixed voice and data communications. Each VDM would have a unique device ID that can be programmed by the user to allow the room to room and station to station voice or data communications.

BRIEF DESCRIPTION OF THE DRAWINGS

This invention will be described with reference to the accompanying drawings, wherein:

FIG. 1 is a block diagram of a PBX system of prior art,

FIG. 2a is a block diagram of the voice and data system of the present invention.

DETAILED DESCRIPTION OF THE PREFERRED EMBODIMENT

Figure 2B:
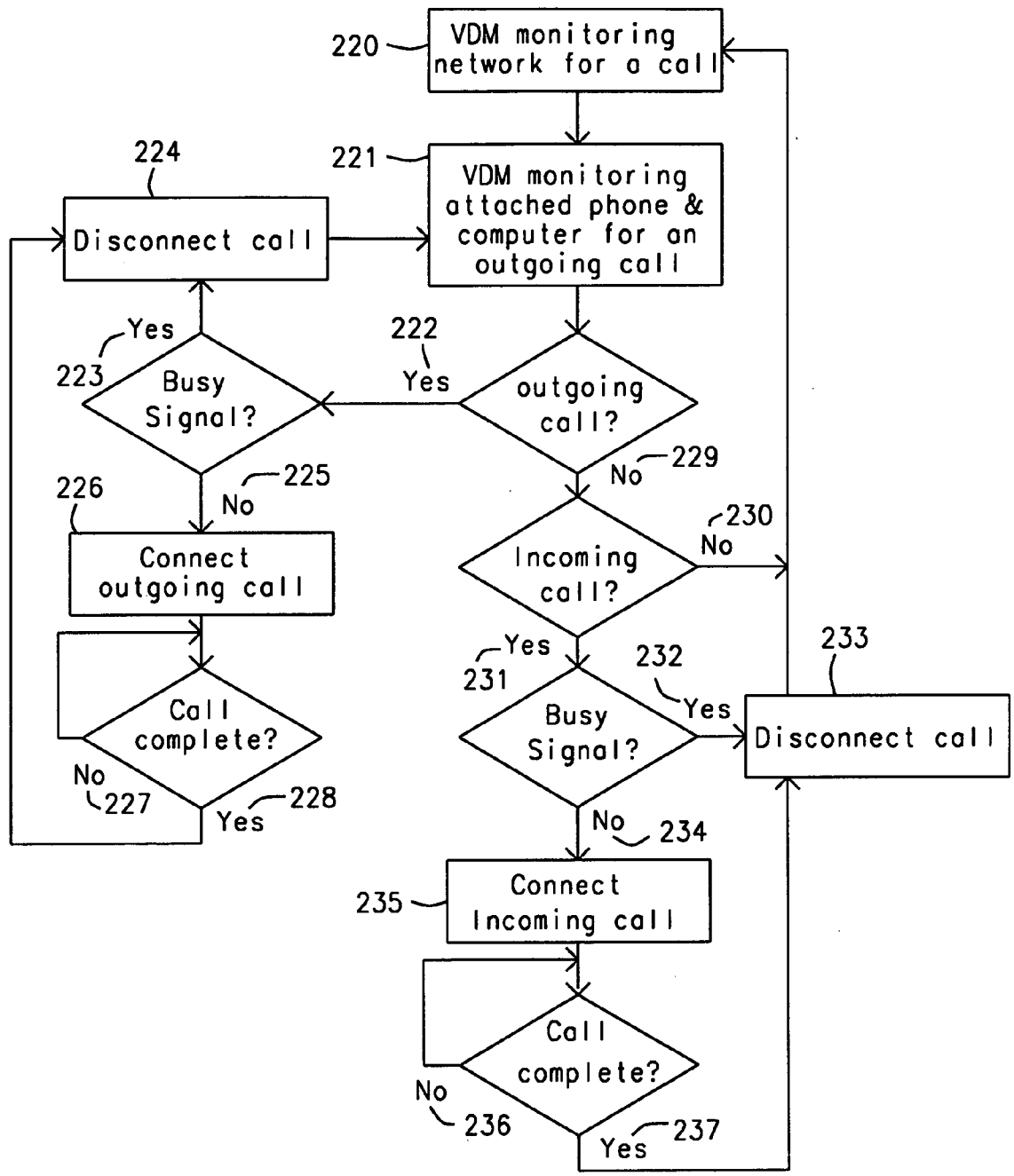
FIG. 2b is a flow diagram showing the overall method of communications in the voice and data system.

In FIG. 1 is shown a PBX system of prior art. A number of phones 10 are connected to a PBX box 12, each through a private wired connection 11. The PBX box 12 routes incoming and outgoing calls between telephones 11, and between telephones 11 and a Public Switched Telecommunication Network (PSTN) 13. Each phone 10 is wired directly to the PBX box 12 which requires a wiring network that is different than the wiring configuration of most homes and buildings that have a multiple number of phone outlets. While being expensive to purchase, the PBX box requires an expensive rewiring of existing homes or buildings.

In FIG. 2a is shown a block diagram of the home voice and data network (HVDN) 20 of the present invention. A plurality of voice and data modules (VDM) 21 are connected to the telephone wiring 22 in a house or building. The wiring 22 can also include telephone wiring in a plurality of buildings as long as there is a wired connection between the buildings that does not require a connection to a PSTN. Each VDM location is assigned an address 23, e.g. 1A, 1B , , , 1M. The individual VDM 21 within a location is addressed as 1A0, 1B0, , , , 1M0. Connected to each VDM 21 can be a phone 24 and a computer (PC) 25. Each phone 24 and each computer 25 have separate addresses, e.g. 1A1 for the phone 24 and 1A2 for the computer 25 connected to VDM-0 21 with address 1A0. The computers are designated as PC-0, PC-1, , , , PC-m and imply personal computers, but any computer capable of communicating by means of Token in Ethernet Protocol (TEP) technology or by modem can be connected by means of the HVDN network.

Continuing to refer to FIG. 2a, a link to wide area network (LTW) device 26 with a network address 1X is connected to the wiring network 22 of the building and provides a communication port to the outside of the HVDN. Connected to the LTW 26 is a PSTN 27 and an Internet service provider (ISP) 28. The LTW device 26 can be connected to a number of individual phone lines 29 depending on the capacity required by the home or building being services by the HVDN. The LTW device 26 receives phone calls from and places calls to external phones by way of the PSTN 27 and Internet telephony through the ISP 28, and connects the calls to the appropriate phone address as directed by an extension number. Although the computers 25 can be connected to the Internet through modem connections through the LTW device 26 and the PSTN 27, a more efficient connection is made through the LTW device 26 directly to an ISP 28. The LTW device 26 converts between Ethernet packets and Internet packets to provide communications between the computers 25 connected to the HDVN 20 and the ISP 28.

Continuing to refer to FIG. 2a, when a phone 24 needs to place a call through the Internet, the telephone 24 dials a destination number, the VDM 21 will convert the signal from the telephone 24 to an Ethernet packet and sent the packet to the LTW device 26. The LTW device 26 converts the Ethernet packet to an Internet packet if Internet Telephony is to be used, or if the local PSTN 27 is to be used the LTW device 26 converts the Ethernet packet containing the dialed number signal from the telephone 24 to a dialing signal and connects it to the PSTN 27. The LTW device 26 converts responses from the ISP 28 and the PSTN 27 to Ethernet packets and sends them to the network address of the phone 24 that placed the call. Besides converting packets and signal and passing them between the connected phones, the LTW device 26 also detects busy signals and hang up signals from the remote phones, converts these signals to Ethernet packets and passes packets to the VDM 21 to which the internal network phone 24 is connected.

Continuing to refer to FIG. 2a, multiple phones 24 can be connected in a conference call configuration where the addresses of each of the phones involved 24 and their respective VDM devices 21 are designated as part of the phone call and known to the LTW device 26 as well as all the VDM devices 21 involved. Many newer homes and buildings are wired with two separate phone lines even though only one is used to connect to the local phone company. This provides the possibility of separating the communications into two distinct and separate HVDN networks 20 with a separate LTW device 26. A connection of a VDM 21 to the telephone wiring 22 in a house or building will most likely be made at a wall connector originally use to provide a connection for a phone device; however, multiple VDM devices 21 can be connected to the telephone wiring of the house or building at these wall connectors and each can have a different length in the network.

In FIG. 2b is shown a functional flow diagram for a VDM device 21 monitoring the network for calls and participating in making connecting calls between phones and between computers. The term call for the flow diagram of FIG. 2b is meant to refer to a request for a connection either between phone or between computers even though the details are not necessarily the same. The VDM monitors the network for an incoming call to either the phone or the computer attached to the VDM. From the perspective of the VDM it matters little where the incoming call originates except for the network address of sender of the call. An outgoing call will be differentiated between one contained within the network by addresses of other VDM devices which are usually extension numbers for telephones and one to outside of the network by the address of the LTW device which is signified by a prefix telephone number like the number "9". Communications between network devices, VDM and LTW, is by means of Tokens in Ethernet Protocol (TEP). Using Ethernet tokens allows each phone 24 and computer 25 connected to a VDM device 21 to be actively communicating over the network 22 during the same period of time.

Continuing to refer to FIG. 2b, a VDM 21 monitors the network for an incoming call 220, and monitors the attached phone 24 and the attached computer 25 for initiating an outgoing call 221. If an outgoing call is detected 222 from either the attached phone 24 or the attached computer 25 and a busy signal 223 is detected from the destination address then the call is disconnected 224 and the VDM returns to monitoring the attached phone and computer. If the call is an outgoing call 222 from the phone 24 or computer 25 connected to the VDM 21 and if there is no busy signal from the destination address 225, then the call is connected 224. If the destination address is another VDM connected to the network, then the call is within the home or building containing the wired network. If the destination is the LTW device 26, the call is outside of the network to an ISP 28 or a PSTN 27. If the call is not complete 227, the VDM continues to monitor the call for a hang up signal from the attached phone or computer, or from the destination device. If the call is complete 228 signaled by the hang up or disconnect of either or both elements doing the communications, the call is disconnected and the VDM returns to monitoring the attached phone and computer for an outgoing call.

Continuing to refer to FIG. 2b, if there is not an outgoing call 229 and there is not an incoming call 230, then the ADM continues to monitor the network for a call 220. If there is an incoming call 231 and if the phone or the computer is busy to the call 232, then the call is disconnected 233. To disconnect the call a packet containing a busy signal is sent to the sending network device, a VDM or a LTW, and the sending network device terminates the call. If there is an incoming call 231 and the phone or computer to which the call is directed is not busy 234, then the incoming call is connected 235. The call continues 236 until the communications are complete 237. Upon completion of the call 237, the call is disconnected 233, and the VDM returns to monitoring the network for an incoming call 220. In disconnecting a call, the two network devices involved in the call, either two VDM devices or a VDM device and a LTW device, must communicate with each other using Ethernet packets signaling that the call has been terminated by either or both devices which make up the connection. Phone calls and computer calls are disconnected when a phone hang up is detected or a computer disconnect signal is detected, and the VDM returns to monitoring network for incoming calls.

Figure 3A:
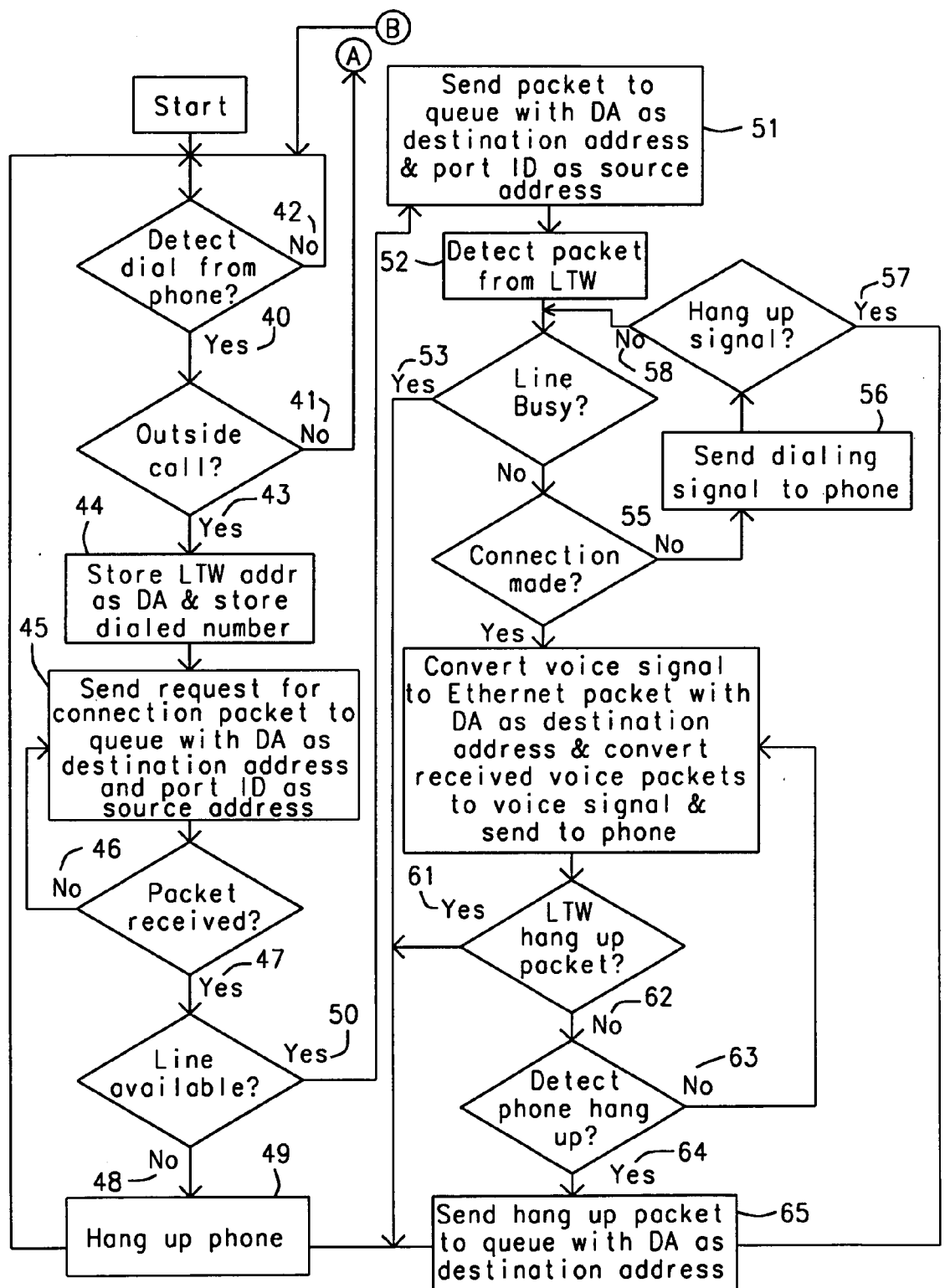
FIG. 3a is a functional flow diagram for a voice and data module when placing a call outside of the wired network in a building.

In FIG. 3a is shown is a functional flow diagram for a VDM device 21 placing a call to a phone outside the HVDN network 20. Each VDM device 21 monitors the phone which is connected to it for a dial signal. If dial signal is not detected 42, the VDM device 21 continues monitoring the phone for a dial signal. If a dial signal is detected 40 and if the signal is for a phone outside of the HVDN network 43, then the LTW address as the destination address DA and store the dialed number 44. The VDM sends a request for a connection packet to the queue 45 with DA as destination address and port ID as the source address. If the connection packet is not received 46, send a request for a connection packet to queue 45. If the connection packet is received 47 and if the line is not available 48, hang up the phone and monitor phone for dial signal. If the connection packet is received 47 and the line is available 50, send the connection packet to the queue with DA as the destination address and port ID as source address 51. The VDM detects a packet from the LTW 52 and if the line is busy 53, hangs up the phone 49. If the line is not busy and the connection is not made 55, send dialing signal to remote phone 56. If hang up signal is received from phone connected to the VDM 57, send a hang up signal to queue with DA as destination address 65 an hang up phone 49. If no hang up signal is received 58, return to monitoring line for a connection to be made through the LTW. Detect Ethernet packet from the LTW 52. If the line is not busy and the connection to the remote phone is made 59, convert a voice signal from the local phone making the call to Ethernet packets with DA as destination address 60. If a hang up packet from the LTW is detected 61, then hang up phone 49. If hang up packet from LTW is not detected 62 but a phone hang up is detected by the VDM 64, then send a hang up packet to queue with DA as the destination address 65 and hang up the phone 49. If hang up packet from LTW is not detected 62 and if the phone is not hung up 63, then continue to convert voice signals to Ethernet packets with DA as destination address 60.

Figure 3B:
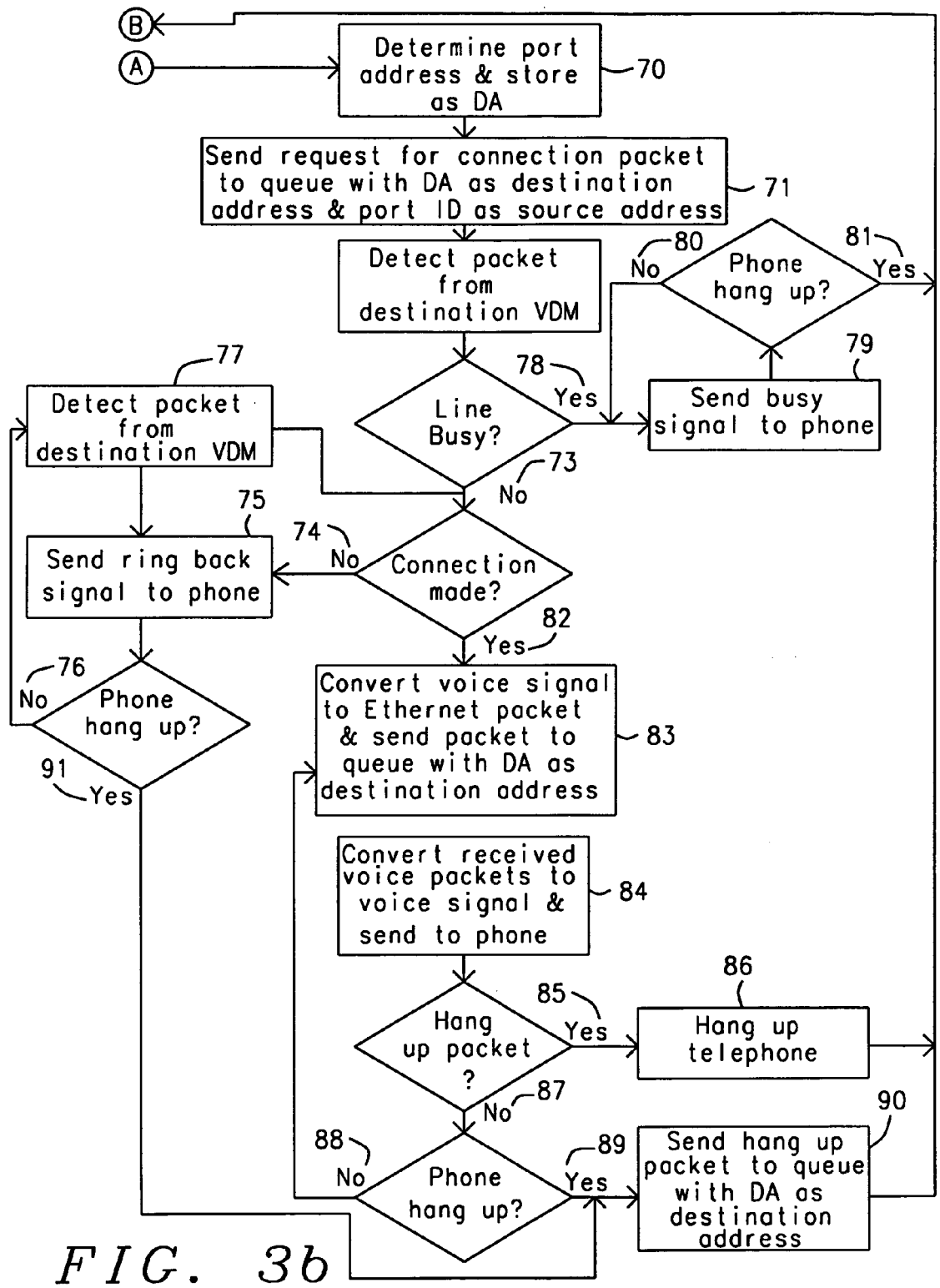
FIG. 3b is a functional flow diagram for a voice and data module when placing a call to a phone inside the wired network in a building.

Referring to FIG. 3b, if a phone call is not placed to a phone outside of the HVDN network 41, then determine the port address within the HVDN network and store as destination address DA 70. Send a request for a connection packet to queue with DA as destination address and port ID as source address 71. Detect a voice packet from a destination VDM 72, and if the line is busy 78, send a busy signal to phone 79. If the phone is not hung up 80, continue to send a busy signal to the phone 79. If the phone is hung up, return to monitoring the phone connected to the VDM for a dial signal. If the line is not busy 73 and if the connection is not made 74, send a ring back signal to phone 75. If the phone is not hung up 76, then return to detecting a packet from the destination VDM 77 to check for a connection to be made. If the phone is hung up 91, send a hang up packet to queue with DA as destination address 90. If a connection is made 82, convert the resulting voice signal to an Ethernet packet and send packet to queue with DA as destination address 83. Convert received voice packet to a voice signal and send to the attached phone 84. If a hang up packet is received 85, hang up phone 86 and return to detecting a dial tone from the attached phone. If a hang up packet is not received 87 and if the phone is hung up 89, then send hang up packet to queue with DA as destination address 90 and return to detecting a dial tone from the attached phone. If a hang up packet is not received 87 and if the phone is not hung up 88, then continue to convert voice signal to Ethernet packet 83 and convert received voice packets to voice signals 84.

Figure 4:
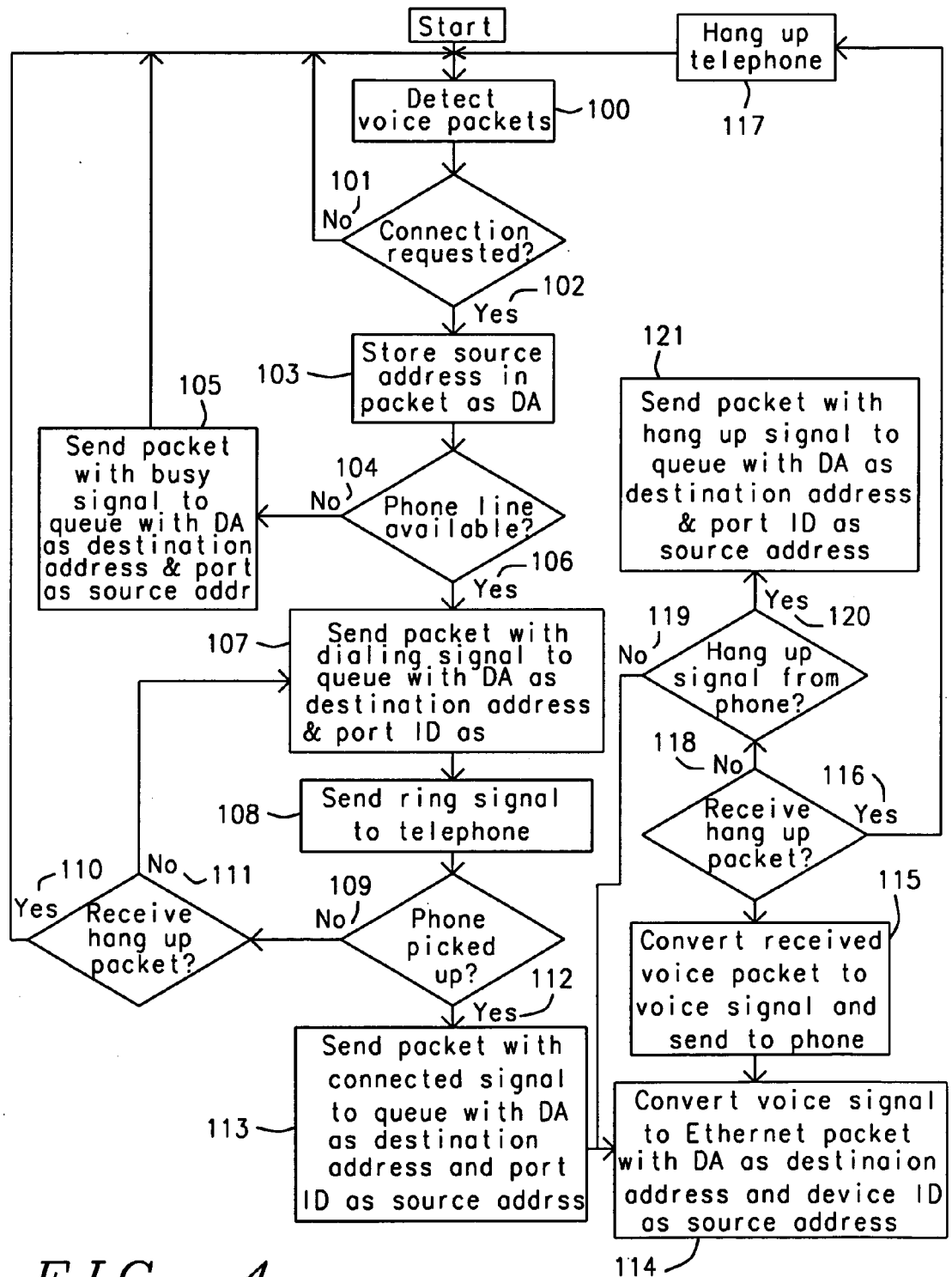
FIG. 4 is a functional flow diagram for a voice and data module when receiving a call.

Referring to FIG. 4, a VDM monitors the HVDN network for voice packets 100 to detect a receiving call. If a connection is not requested 101, then monitoring network to detect voice packets continues 100. If a connection is requested 102, then the source address is stored in a packet as destination address DA 103. If phone line is not available 104, send packet with busy signal to queue with DA as destination address and port ID as source address 105 and return VDM to detecting voice packets 100. If phone line is available 106, send packet with dialing signal to queue with DA as destination address and port ID as source address 107. Send ring signal to phone connected to VDM 108. If the phone is not picked up 109 and a hang up packet has not been received 111, then send a packet with dialing signal to queue with DA as destination address and port ID as source address 107. If the phone is not picked up 109 and a hang up packet has been received 110, then return VDM to detecting voice packets 100. If phone has been picked up 112, send packet with connected signal to queue with DA as destination address and port ID as source address 113. Convert voice signal to Ethernet packet with DA as destination address and device ID as source address 114. Convert received voice packet to voice signal and send to phone 115. If a hang up packet is received 116, hang up phone 117 and return to detecting voice packets 100. If hang up packet is not received 118, and hang up signal from phone is not received 119, then continue converting voice signals to Ethernet packets with DA as destination address and device ID as source address 114. If hang up packet is not received 118, and hang up signal from phone is received 120, send packet with hang up signal to queue with DA as destination address and port ID as source address 121, and return to detecting voice packets 100.

Figure 5:
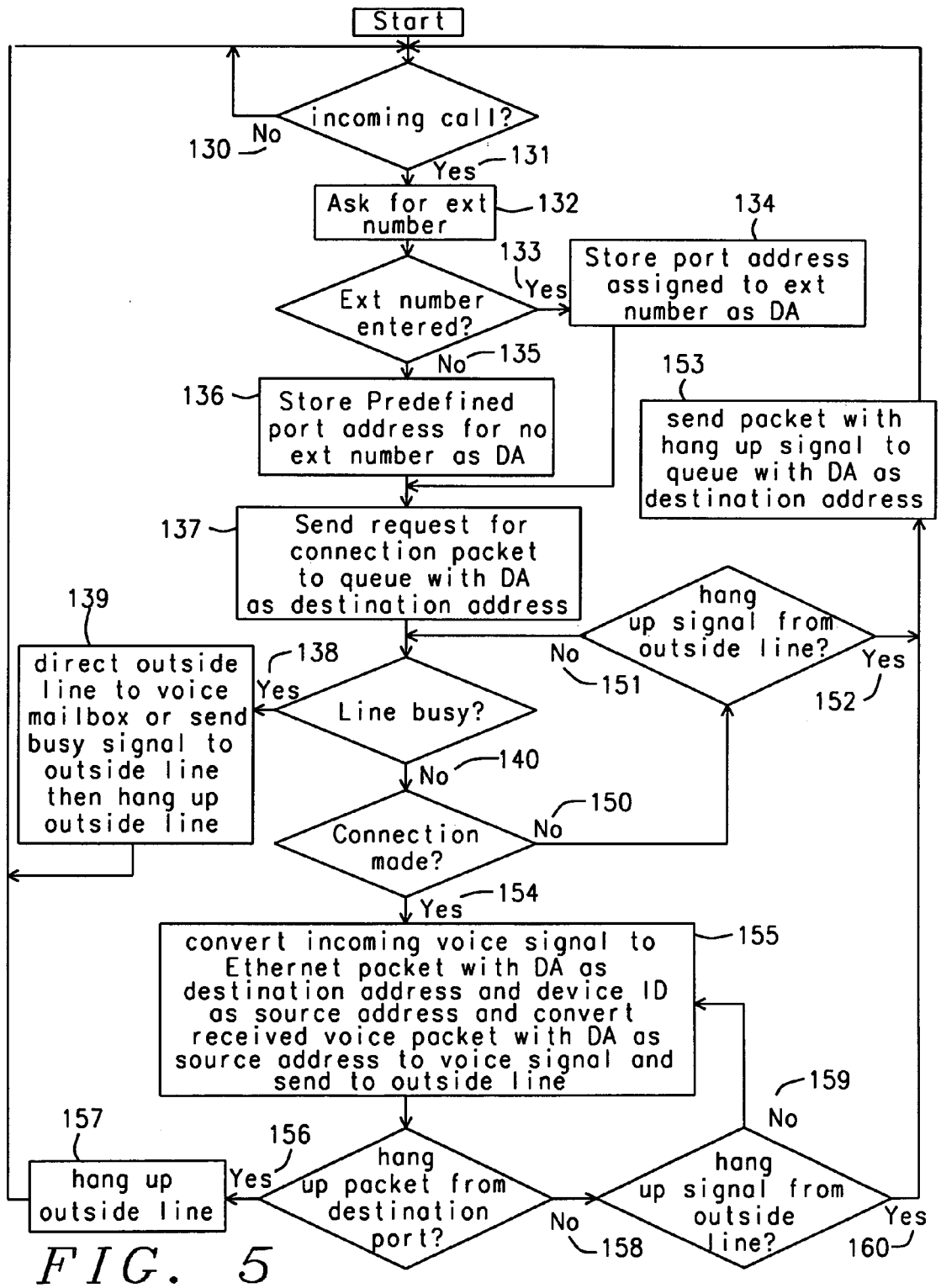
FIG. 5 is a functional flow diagram for a link to wide area network device when receiving an outside call.

Referring to FIG. 5, an LTW device receives calls from outside the HVDN network, If there is no incoming call 130, continue to monitor for an incoming call. If an incoming call is detected 131, ask for an extension number 132. If an extension number is not received 135, then store predefined port address for no extension number as destination address DA 136. If an extension number is received 133, store port address assigned to the extension address as the destination address DA 134. Send a request for connection packet to queue with DA as destination address 137. If line is busy 138, direct outside line to mail box if available or send a busy signal to outside line then hang up connection to outside line 139. If line is not busy 140 and if a connection is not made 150, then the LTW continues to monitor for a connection packet 161. If there is no hang up signal from outside line 151, then the LTW continues to monitor connection status. If there is a hang up signal from the outside line 152, then a packet is sent with the hang up signal to queue with DA as destination address. If line is not busy 140 and if connection is made 154, then the LTW converts incoming voice signal to an Ethernet packet with DA as destination address and device ID as source address, and converts received voice packets with DA as source address to voice signals to be sent to outside line 155. If a hang up packet is received from the destination port 156, hang up the out side line 157 and return to monitoring for an incoming call. If no hang up packet is received from the destination port 158 and there is no hang up signal from the outside line 159, continue converting incoming voice signals to Ethernet packets and converting voice packets to voice signals 155. If no hang up packet is received from the destination port 158 and there is a hang up signal from the outside line 160, send packet with hang up signal to queue with DA as destination address 153 and return to monitoring for an incoming call.

Figure 6A:
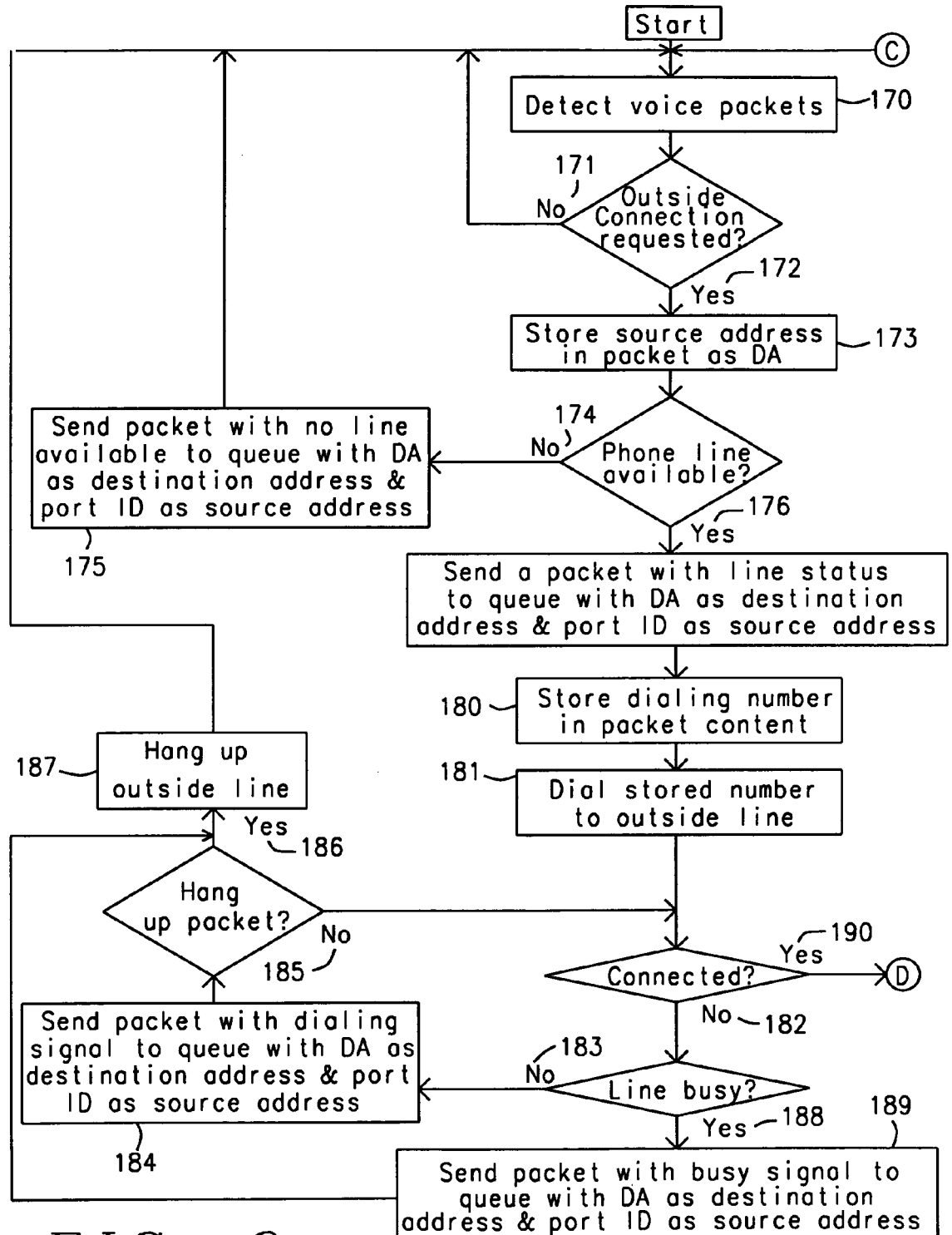
FIGS. 6a and 6b are a functional diagram for a link to wide area network device when placing an outside call.

Referring to FIG. 6a, an LTW device places a call to a phone outside of the HVDN network. The LTW detects the network for voice packets 170. If no outside connection is requested 171, the LTW continues to monitor the network for voice packets 170. If an outside connection is requested 172, the source address is stored in a packet as DA 173. If the phone line is not available 174, a packet is sent to queue with no line available with DA as destination address and port ID as source address 175. If the phone line is available 176, a packet is sent with line status to queue with DA as destination address and port ID as source address 177. The dialing number is stored in packet content 180 and the stored number is dialed to the outside line 181. If the outside phone is not connected 182 and the line is not busy 183, then a packet is sent with dialing signal to queue with DA as destination address and port ID as source address 184. If hang up packet is not received 185, continue monitoring for connection to outside phone. If hang up packet is received from requesting phone within the HVDN 186, hang up outside line 187 and return to monitoring the network for voice packets 170. If the outside phone is not connected 182 and the line is busy 188, then a packet is sent with busy signal to queue with DA as destination address and port ID as source address 189, and outside line is hung up 187. If a connection is made with the outside phone 190, a packet with a connection signal is sent to the queue with DA as destination address and port ID as source address 200 as shown in FIG. 6b.

Figure 6B:
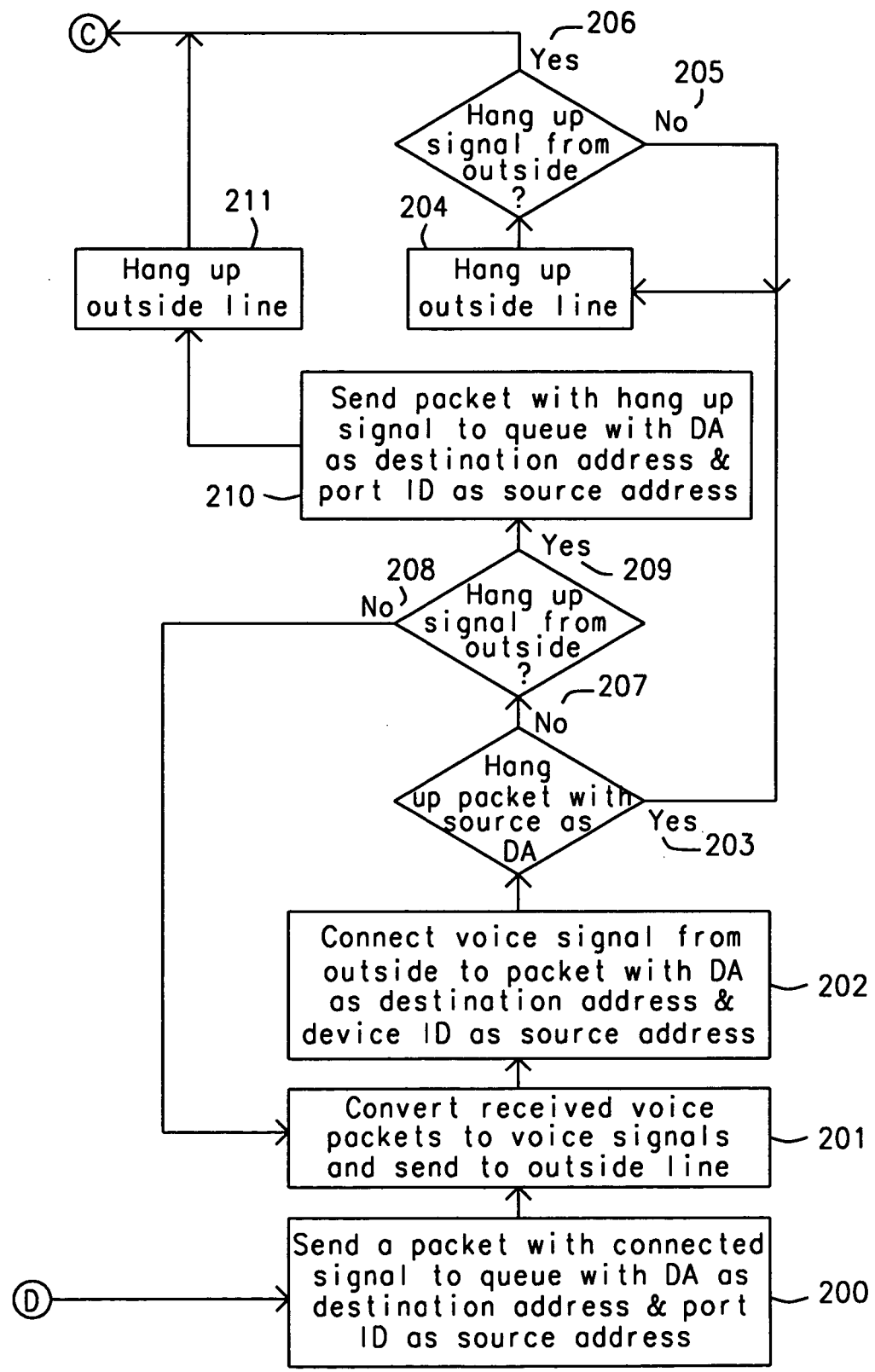

Referring to FIG. 6b, voice packets are converted to voice signals and sent to the outside line 201, and voice signals from outside the line are converted to packets with DA as destination address and device ID as source address 202. If a hang up packet with source as DA is received 203, the outside line is hung up 204. If there is not a hang up signal from the outside line 205, continue to hang up the outside line 204. If a hang up signal is received from the outside line 206, return the LTW to detecting voice packets 170. If a hang up packet with source as DA is not received 207 and if there is no hang up signal from the outside line 208, then continue converting received voice packets to voice signals 201 and converting voice signals from outside line to packets 202. If a hang up packet with source as DA is not received 207 and if there is a hang up signal from the outside line 209, send packet with hang up signal to queue with DA as destination address and port ID as source address 210. Hang up out side line 211 and return the LTW to detecting voice packets 170.

While the invention has been particularly shown and described with reference to preferred embodiments thereof, it will be understood by those skilled in the art that various changes in form and details may be made without departing from the spirit and scope of the invention.

What is claimed is:

1. A voice and data network, comprising:
   a) a telephone and a computer connected to a voice and data module (VDM) device, the telephone and computer having unique assigned network addresses with respect to one another,
   b) a plurality of said VDM devices connected to a plurality of telephone wires in a building,
   c) said plurality of telephone wires connected together to provide a telephone network in which only one phone can communicate on a given line at one time,
   d) a link to wide area network (LTW) that connects said telephone network to a Public Service Telephone Network (PSTN) and an Internet Service Provider (ISP),
   e) said LTW and said plurality of said VDM devices communicate together over said telephone network using communication addresses assigned to said LTW and each VDM device of said plurality of VDM devices by means of Token in Ethernet Protocol technology.

2. The voice and data network of claim 1, wherein each of said plurality of VDM devices includes at least a first connection for a telephone and a second connection for a personal computer.

3. The voice and data network of claim 2, wherein each VDM device is connected to the telephone wires by an ordinary phone jack.

4. The voice and data network of claim 1, wherein telephone service is provided to said building from said ISP and said PSTN.

5. The voice and data network of claim 1, wherein:
   the voice and data network is organized into at least two VDM locations, each VDM location including a VDM device having a first network address, a first connection for a device that is assigned a second network address, and a second connection for a device that is assigned a third network address, the first, second and third network addresses being different from one another.

6. The voice and data network of claim 5, wherein:
   each VDM device is connected to a telephone by the first connection and connected to a computer by the second connection.

7. A method for communicating between network elements in a voice and data network, comprising:
   a) monitoring a communication network by a first voice and data module (VDM) for a call from a second VDM and a call from a link to a wide area network (LTW) connected to said communication network,
   b) monitoring a first phone and a first computer attached to said first VDM for an outgoing call to a destination containing a second phone and second computer connected to said second VDM, or an outside phone and an outside computer network through said LTW, the first phone having a first identification (ID) value and first computer having a second D value different from the first ID value,
   c) detecting said outgoing call to a destination phone and connecting said call if said destination phone is not busy, else providing a busy signal and disconnecting said outgoing call, connecting said call including, if the destination phone is picked up, converting voice signals to a packet with an ID value as a source address, the ID value being the first ID value if the outgoing call originates from the first phone and being the second ID value if the outgoing call originates from the first computer,
   d) detecting an incoming call and connecting said call if a receiving device comprising said first phone and said first computer is not busy, else sending back said busy signal and disconnecting said incoming call,
   e) disconnecting phone calls or computer calls when a phone hang up or a computer disconnect signal is detected and returning to monitoring said network for said incoming call; and
   communicating between computers according to Token in Ethernet protocol eliminating the need for any conversion.

8. The method of claim 7 wherein, within step c) connecting said call further includes, if said outgoing call is not an outside call, sending a request for connection packet addressed to the second VDM and not the LTW.

9. The method of claim 7 wherein, connecting a long distance phone call is done through said ISP without the use of a computer to assist in the call.

10. The method of claim 7 further including, detecting a request from said first computer for a connection to an Internet service provider (ISP), sending request for the connection to said LTW and completing connection to said ISP when the LTW responds with a connection completed signal.

11. The method of claim 7, wherein:
step e) further includes, if a hang up is detected from the first phone and an LTW hang up packet from the LTW has not been detected, sending a VDM hang up packet to queue, the VDM hang up packet having an address of the LTW as a destination address.

12. The method of claim 7, wherein:
step c) further includes sending a packet with a no line available indication from the LTW if an outside line connected to the LTW is not available.

13. The method of claim 7, wherein: step d) further includes the LTW requesting an outside call to provide extension data for an incoming call, and if an extension number is not received, storing a predefined port address as a destination address in request for connection packet.

* * * * *

UNITED STATES PATENT AND TRADEMARK OFFICE
CERTIFICATE OF CORRECTION

PATENT NO. : 7,130,297 B1 Page 1 of 1
APPLICATION NO. : 09/519605
DATED : October 31, 2006
INVENTOR(S) : Peter C. P. Sun It is certified that error appears in the above-identified patent and that said Letters Patent is hereby corrected as shown below:

At column 10, line 34, Claim 7, please replace "D" with "ID" so that the corresponding phrase reads -- a second ID value --.

Signed and Sealed this

Seventeenth Day of June, 2008

JON W. DUDAS
*Director of the United States Patent and Trademark Office*